Patented Mar. 4, 1941

2,233,812

UNITED STATES PATENT OFFICE 2,233,812

GERMICIDE AND PROCESS FOR MAKING THE SAME

Paul Goedrich, Newark, N. J.

No Drawing. Application February 16, 1939, Serial No. 256,769

5 Claims. (Cl. 167—70)

This invention relates to improvements in iodized bile compounds and methods for their preparation.

Recently compounds of iodine with bile acids, and more particularly iodized natural bile acid salts have been prepared by this applicant by simple prolonged slow reaction between the bile element and crystalline iodine in solution or even only intermixed in the dry state. (Goedrich, U. S. Patent No. 2,121,029, June 21, 1938.)

The whole purified bile product thus treated with iodine contributed to the production of an iodine composition which presented the advantages of chemically combined and physically adsorbed iodine. In order to produce these iodine compounds, the reaction was conducted without the application of heat except optionally for the purpose of accelerating the reaction up to a point of carrying the reaction up to a point of equilibrium. It was then the desideratum to obtain a water-soluble product containing optimum amounts of chemically combined and adsorbed iodine.

It has now been found that a related group of such compounds can be produced in varying degrees of water soluble and water insoluble constitution by heating beyond the point of attainment of the normal equilibrium of reaction according to the old method described.

Thus, for instance, if 42 parts of dried natural ox bile salts are mixed with about 14 parts of crystalline iodine, in say about two hundred parts of water, the reaction will slowly proceed to substantial completion of chemical saturation and maximum adsorption to produce a product which will be substantially entirely water-soluble. But it has now been found that if heat is continued to be applied, after normal reaction, as above described, is completed, a different result is achieved.

After such or similar mixture has been reacted to a point where no further iodine is released in the vapor phase, it may be assumed empirically that the direct action of the ingredients has been practically attained. But if now the application of heat, say from 60–100° C. is continued, it is found that a gradual precipitation takes place.

In the early stages of heat application a more or less heavy viscous alcohol-soluble and water-insoluble mass begins to develop. This precipitate, from the very beginning, begins to show an increased water-insolubility. By the continued application of heat beyond the prescribed limits of mere acceleration and within the obvious upper limits of decomposition, this formation of water-insoluble and alcohol-soluble product increases.

When the exemplified mixture is thus submitted to the action of heat as indicated is continued, say for approximately 5 hours, the product of precipitation is completed and the precipitate becomes almost firm. This final and completed precipitation product may then be evaporated to comparative dryness and ground to a powder for special adaptation as, for instance, in the treatment of osteomyelitis.

By the new method, depending on the degree of heat applied and the time of such application, varying degrees of water-soluble and insoluble and alcohol-soluble fractions may be produced.

These iodized bile products, especially in the less water-soluble form, in the form of the dried powders as such or in diluted powder form with bentonite and other similar diluents can then be utilized for dusting powders and dressings to give up their iodine content slowly in situ and without the necessity for frequent redressing.

Even in the earlier stages of the thermal precipitation, say after heating for about two hours, when a semi-viscous preparation has resulted this may already be used advantageously directly for various dermatological treatments such as in ring-worm, scabies, impetigo, etc.

But, where it is desirable to have a preparation for prolonged application with slow but constant release of free iodine in situ without redressing, as in bone infections or lesions, it is more desirable to apply the product of low solubility, to wit one where the heat reaction has been carried to the limit.

The heating does not merely accelerate the reaction as would normally be expected, and also rapidly produce a maximum and desirable equilibrium of hydriodic acid, but also gradually and progressively changes the physical properties of the reaction product with a constantly increasing water-insoluble fraction. This permits the purposeful adaptation of the time and temperature control to various therapeutic uses as indicated.

It must be understood that in the application of the process, these time-temperature ranges will vary to some degree according to percentages of ingredients in process, but also to an appreciable extent upon the compositional values of the biles, respectively, the bile salts, put into process, depending upon the commercial, animal, and seasonal origins. The example heretofore given, refers to the most convenient and practical method of using the readily commercially available dried ox-bile of the market.

As stated, the water-insoluble fractions are, however, soluble in alcohol and thus lend themselves readily to the preparation of alcoholic solutions of iodized bile compounds in substantially all proportions, according to the strength of iodine content desired.

With this new treatment it is now possible to obtain iodized-bile product in a wide range of consistencies and solubility values which will lend themselves to various therapeutic, pharmaceutical and agricultural, bactericidal and insecticidal adaptations.

In the process previously developed by the applicant, it had already been noticed that increasing amounts of hydriodic acid are formed in the case of the prolonged reaction without heat. This point was not considered in the old invention because there we were only concerned with the production of the iodized choleates per se.

But later it was found surprisingly that the germicidal power of the iodized bile were increased in a manner which was not entirely explainable on the basis of mere relative content of iodine in any of the physical forms resulting from various periods and degrees of heating.

In the meantime the applicant has made a further discovery in connection with germicides generally that their germicidal power is considerably enhanced by an appropriate lowering in the pH of the effective solution by the addition of appropriate acids. The rapid generation to the point of equilibrium of the HI content is, therefore, also an added advantage of heating the reaction mixture as indicated. When it is found desirable to use the materials after an intermediate period of heating and semi-precipitation, the presence of the acid condition is of distinct advantage in the activation of the germicidal effect.

The new process also tends to the prompt and effective elimination of fats and fatty substances, especially by the presence of immediately available amounts of the newly and rapidly formed hydriodic acid and results in products having improved odor and clearer solubility through the elimination of mucin, etc., and with lower viscosity.

From the very beginning of the precipitation and to the end of the reaction and treatment for the production of the ultimate dried, substantially water-insoluble product, a decided acid reaction is noticeable. Whether this is due to the acid character of the products themselves, or to the formation and retention of small amounts of hydro-iodic and/or iodic acid has not been definitely determined, but this acidity is itself also helpful in the bactericidal effectiveness of the compounds, as the applicant has been able to demonstrate in connection with other research that a lower pH decidedly enhances bactericidal power.

Obviously, owing to the variable character of the commercial bile products available on the market, and the permissible variations in method, it is not possible to give precise limitations of the constitutional values of all products, but when the initial materials are used in accordance with the illustrative example, as the heating process is carried to the limit of substantially complete precipitation, the completely dried and powdered substantially water-insoluble, alcohol-soluble iodized bile product will have a total iodine content of about 16–18 per cent, the titratable part amount being on the average about 5–6 per cent of the total product.

I claim:

1. In a process for preparing germicidal compounds of natural animal bile products and iodine in varying predetermined degrees of viscosity and water insolubility, the steps which comprise adding measured quantities of powdered iodine to a solution of such bile products in water, and subjecting the reaction mixture to heating to temperatures ranging from about 60–100° C., from a time when no more iodine vapors are emitted and up to about 5 hours thereafter and until no further precipitation or solidification results.

2. Iodized bile salts comprising iodine in chemical combination and bound by adsorption substantial portions of which are practically insoluble in water but soluble in alcohol when prepared according to the process of claim 1.

3. As a new composition of matter a liquid preparation of iodized bile salts comprising a water and alcohol soluble fraction together with a water-insoluble, alcohol soluble fraction suspended therein, when prepared according to the process of claim 1.

4. Iodized bile salts in the form of a dry powder in the main substantially insoluble in water but soluble in alcohol, of acid reaction, comprising about 16–18% of total iodine and about 5–6% of adsorbed titratable iodine, when prepared according to the process of claim 1.

5. As new pharmaceutical products, aqueous-alcoholic solutions of a bile and iodine reaction product which latter contain a water- and alcohol-soluble fraction and a water-insoluble and alcohol-soluble fraction, substantially prepared according to the process of claim 1.

PAUL GOEDRICH.